(12) United States Patent
Wicks

(10) Patent No.: US 10,364,740 B1
(45) Date of Patent: Jul. 30, 2019

(54) FLUID DELIVERY PORT OF AN INTEGRAL CYLINDER HEAD

(71) Applicant: FORD GLOBAL TECHNOLOGIES, LLC, Dearborn, MI (US)

(72) Inventor: Christopher Donald Wicks, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/871,243

(22) Filed: Jan. 15, 2018

(51) Int. Cl.
| | |
|---|---|
| *F02B 47/06* | (2006.01) |
| *F02B 77/04* | (2006.01) |
| *F02F 1/22* | (2006.01) |
| *F02M 25/10* | (2006.01) |
| *F02M 25/14* | (2006.01) |
| *F02M 43/04* | (2006.01) |

(52) U.S. Cl.
CPC .............. *F02B 47/06* (2013.01); *F02B 77/04* (2013.01); *F02F 1/22* (2013.01); *F02M 25/10* (2013.01); *F02M 25/14* (2013.01); *F02M 43/04* (2013.01)

(58) Field of Classification Search
CPC ..... F02F 1/40; F02F 1/002; F02F 1/22; B33Y 80/00; F02M 25/14; F02M 43/04; F02M 25/10; F02B 47/06; F02B 77/04
See application file for complete search history.

(56) References Cited

U.S. PATENT DOCUMENTS

| | | | |
|---|---|---|---|
| 3,411,490 A | 11/1968 | Akana | |
| 4,475,525 A | 10/1984 | Fukae | |
| 6,260,546 B1 * | 7/2001 | Vaughn | F02B 47/02 123/297 |
| 6,378,512 B1 * | 4/2002 | Staggemeier | F02M 19/00 123/585 |
| 6,422,221 B2 | 7/2002 | Pietrowski et al. | |
| 6,520,165 B1 * | 2/2003 | Steele | B05B 7/0807 123/305 |
| 6,561,172 B1 * | 5/2003 | Chestnut | F02M 25/14 123/585 |
| 6,691,688 B1 | 2/2004 | Chestnut | |
| 6,782,872 B2 * | 8/2004 | Moschini | F02B 31/085 123/306 |
| 8,011,352 B2 | 9/2011 | Shinkai et al. | |
| 8,459,015 B1 | 6/2013 | Coletta | |
| 8,813,710 B2 | 8/2014 | Thomas et al. | |
| 8,997,722 B1 * | 4/2015 | Fowler | F02M 7/00 123/536 |
| 9,284,917 B2 | 3/2016 | Martins et al. | |
| 9,488,134 B2 | 11/2016 | Jun | |
| 9,562,632 B1 * | 2/2017 | Billman | G01S 7/4817 |
| 2004/0255918 A1 | 12/2004 | Mackey et al. | |

(Continued)

FOREIGN PATENT DOCUMENTS

CN 103775235 A 5/2014

*Primary Examiner* — Hung Q Nguyen
*Assistant Examiner* — Brian P Monahon
(74) *Attorney, Agent, or Firm* — Julia Voutyras; Brooks Kushman P.C.

(57) ABSTRACT

An engine additive fluid port includes a series of material layers arranged as a first oblong hollow member configured to seamlessly surround at least a portion of an intake port of an integrated cylinder head. The member penetrates into a cavity of the intake port via a plurality of nozzles featuring apertures capable of spraying a first fluid into the cavity.

20 Claims, 8 Drawing Sheets

(56) References Cited

U.S. PATENT DOCUMENTS

| | | | |
|---|---|---|---|
| 2005/0081827 A1* | 4/2005 | Grant | F02M 25/10 |
| | | | 123/470 |
| 2007/0017492 A1* | 1/2007 | Baasch | F02M 25/00 |
| | | | 123/585 |
| 2008/0164694 A1* | 7/2008 | Zdroik | F02M 69/462 |
| | | | 285/331 |
| 2010/0051002 A1* | 3/2010 | Wade | F02B 13/00 |
| | | | 123/575 |
| 2010/0139636 A1* | 6/2010 | Atherley | F02B 43/10 |
| | | | 123/585 |
| 2011/0308483 A1* | 12/2011 | Lafferty | F02M 25/10 |
| | | | 123/41.01 |
| 2012/0138007 A1 | 6/2012 | Smith et al. | |
| 2014/0305122 A1 | 10/2014 | Springer et al. | |
| 2015/0059704 A1* | 3/2015 | Wilson | F02M 69/50 |
| | | | 123/470 |
| 2015/0176478 A1 | 6/2015 | Wicks et al. | |
| 2015/0176480 A1 | 6/2015 | Maceroni et al. | |
| 2016/0215704 A1 | 7/2016 | Wicks | |
| 2017/0067413 A1 | 3/2017 | Maki et al. | |
| 2017/0152810 A1 | 6/2017 | Wicks | |

\* cited by examiner

FLUID DELIVERY PORT OF AN INTEGRAL CYLINDER HEAD

TECHNICAL FIELD

Various embodiments relate to an integral cylinder head for an internal combustion engine in a vehicle, the cylinder head features a fluid delivery port, and a method of making the same.

BACKGROUND

A cylinder head is a part of the powertrain which serves as a housing for various engine components such as the intake manifold, exhaust valves, springs, lifters, and combustion chamber. A cylinder head is structured to distribute a variety of fluids. A number of passages or ports formed in the cylinder head allow gasses such as ambient air and fuel to flow inside the cylinder. At the same time, the cylinder head permits exhaust gas to flow out of it. The cylinder head also channels a coolant fluid into the engine block, thereby cooling down the engine components.

SUMMARY

According to an embodiment, an engine additive fluid port is disclosed. The engine additive fluid port includes a series of material layers arranged as a first oblong hollow member configured to seamlessly surround at least a portion of an intake port of an integrated cylinder head, the member penetrating into a cavity of the intake port via a plurality of nozzles featuring apertures configured to spray a first fluid into the cavity. The hollow member may surround the port only partially. The hollow member may penetrate a portion of the cylinder head between adjacent intake ports. The hollow member may form a rounded rectangle. The first fluid may be nitrous oxide. The first fluid may be a service fluid. The port may include a second hollow member including nozzles featuring apertures capable of spraying a second fluid into the cavity. The first and second fluid may be different fluids. The first and second hollow members may be connected via tubing.

In an alternative embodiment, an automotive powertrain system is disclosed. The system includes a nitrous oxide reservoir, an engine cylinder head with an intake port, and a nitrous oxide port of stratified layers integral with the engine cylinder head, connected to the nitrous oxide reservoir and having an inlet branching into a plurality of wings housing a plurality of apertures protruding into an internal surface of the intake port such that there is no seal between the nitrous oxide port and the cylinder head. The plurality of wings may include two symmetrical wings. Each of the plurality of apertures may include a diverter. The diverter may be tapered. The diverter may prevent distribution of the fluid into a central portion of an intake port.

In a yet alternative embodiment, an engine system is disclosed. The system includes a cylinder head. The system also includes a first curved layered duct forming a nitrous oxide port configured to increase an internal combustion engine's power output and surrounding a portion of the cylinder head such that there is no seal between the duct and the cylinder head, the duct at least partially surrounding an exterior portion and penetrating into an interior portion of an intake port via a plurality of nozzles with openings to deliver the nitrous oxide into the interior. The system also includes a second curved layered duct forming a nitrous oxide port. The first and second ducts may be independent from each other. The first and second ducts may share a same supply of nitrous oxide. The plurality of nozzles may include tips having the openings. The openings may be identical.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Reference is being made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

An internal combustion engine includes an engine with one or more cylinders. Each of the cylinders is covered with a cylinder head which sits above each cylinder and on top of a cylinder block. The cylinder head closes at the top of the cylinder and thus forms a combustion chamber. In addition, the cylinder head provides space for the passages that feed fuel, ambient air, exhaust gas recirculator (EGR) gas, and the like as a mixture to the cylinder and allow exhaust to escape. The cylinder head may also be a suitable location to mount spark plugs, valves, and fuel injectors.

Figure 1:
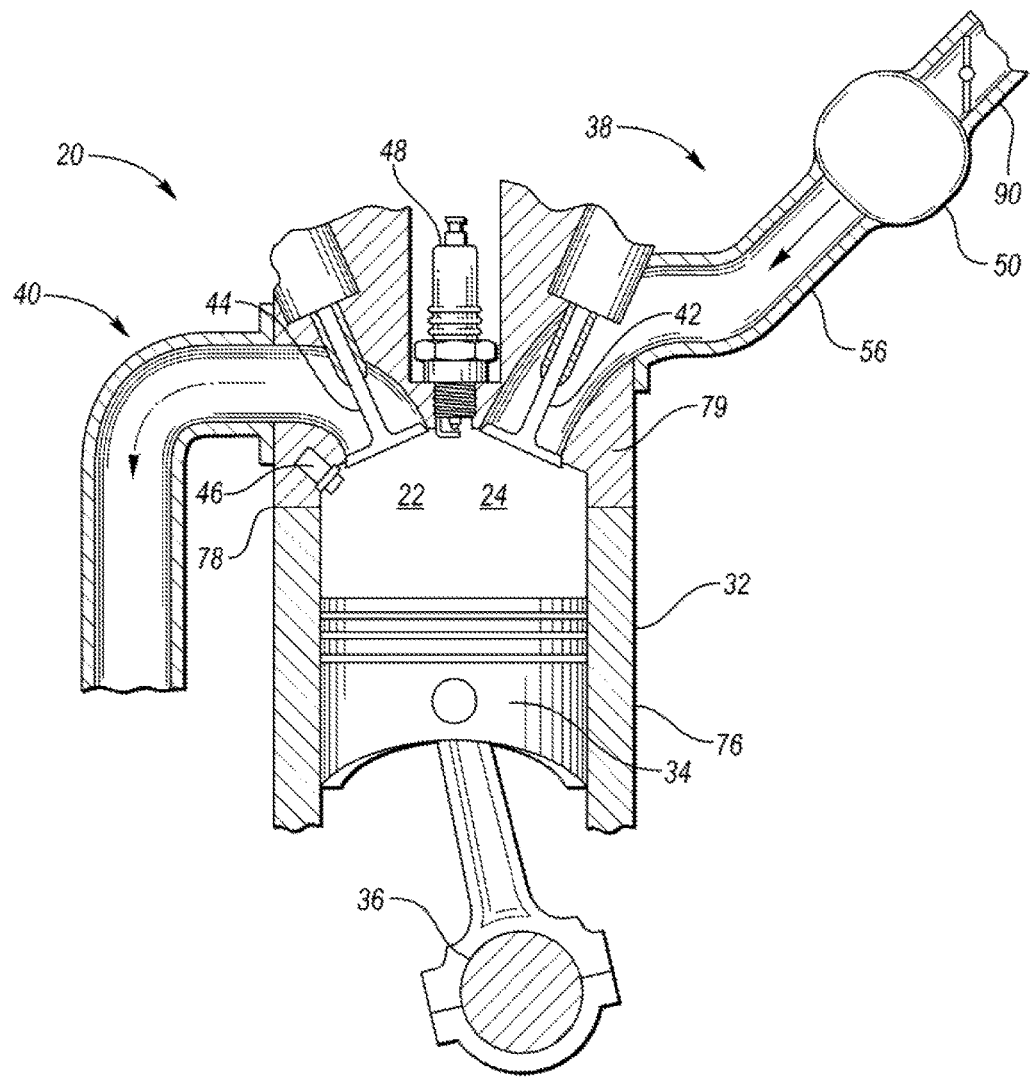
FIG. 1 illustrates a schematic view of a non-limiting example of an internal combustion engine capable of employing various embodiments of the present disclosure.

The cylinder head features a number of ports, passages, and/or channels which lead a variety of fluids to cylinders and other parts of the engine. Geometry, orientation, and design of the cylinder head has direct impact on the internal combustion engine efficiency. FIG. 1 illustrates a schematic non-limiting example of an internal combustion engine 20. The engine 20 has a plurality of cylinders 22, one of which is illustrated. The engine 20 may have any number of cylinders 22, including three, four, six, eight, or another number. The cylinders may be positioned in various configurations in the engine, for example, as a V-engine, an inline engine, or another arrangement.

The example engine 20 has a combustion chamber 24 associated with each cylinder 22. The cylinder 22 is formed by cylinder walls 32 and piston 34. The piston 34 is connected to a crankshaft 36. The combustion chamber 24 is in fluid communication with an example intake manifold 38 and the exhaust manifold 40. An intake valve 42 controls flow from the intake manifold 38 into the combustion chamber 24. An exhaust valve 44 controls flow from the combustion chamber 24 to the exhaust manifold 40. The intake and exhaust valves 42, 44 may be operated in various ways as is known in the art to control the engine operation.

A fuel injector 46 delivers fuel from a fuel system directly into the combustion chamber 24 such that the engine is a direct injection engine. A low pressure or high pressure fuel injection system may be used with the engine 20, or a port injection system may be used in other examples. An ignition system includes a spark plug 48 that is controlled to provide energy in the form of a spark to ignite a fuel air mixture in the combustion chamber 24. In other embodiments, other fuel delivery systems and ignition systems or techniques may be used, including compression ignition.

The engine 20 includes a controller and various sensors configured to provide signals to the controller for use in controlling the air and fuel delivery to the engine, the ignition timing, the power and torque output from the engine, and the like. Engine sensors may include, but are not limited to, an oxygen sensor in the exhaust manifold 40, an engine coolant temperature, an accelerator pedal position sensor, an engine manifold pressure (MAP) sensor, an engine position sensor for crankshaft position, an air mass sensor in the intake manifold 38, a throttle position sensor, and the like.

In some embodiments, the engine 20 may be used as the sole prime mover in a vehicle, such as a conventional vehicle, or a stop-start vehicle. In other embodiments, the engine may be used in a hybrid vehicle where an additional prime mover, such as an electric machine, is available to provide additional power to propel the vehicle.

Each cylinder 22 may operate under a four-stroke cycle including an intake stroke, a compression stroke, an ignition stroke, and an exhaust stroke. In other embodiments, the engine may operate with a two-stroke cycle. During the intake stroke, the intake valve 42 opens and the exhaust valve 44 closes while the piston 34 moves from the top of the cylinder 22 to the bottom of the cylinder 22 to introduce air from the intake manifold 38 to the combustion chamber 24. The piston 34 position at the top of the cylinder 22 is generally known as top dead center (TDC). The piston 34 position at the bottom of the cylinder 22 is generally known as bottom dead center (BDC).

During the compression stroke, the intake and exhaust valves 42, 44 are closed. The piston 34 moves from the bottom towards the top of the cylinder 22 to compress the air within the combustion chamber 24.

Fuel is then introduced into the combustion chamber 24 and ignited. In the engine 20 shown, the fuel is injected into the chamber 24 and is then ignited using spark plug 48. In other examples, the fuel may be ignited using compression ignition.

During the expansion stroke, the ignited fuel air mixture in the combustion chamber 24 expands, thereby causing the piston 34 to move from the top of the cylinder 22 to the bottom of the cylinder 22. The movement of the piston 34 causes a corresponding movement in crankshaft 36 and provides for a mechanical torque output from the engine 20.

During the exhaust stroke, the intake valve 42 remains closed, and the exhaust valve 44 opens. The piston 34 moves from the bottom of the cylinder to the top of the cylinder 22 to remove the exhaust gases and combustion products from the combustion chamber 24 by reducing the volume of the chamber 24. The exhaust gases flow from the combustion cylinder 22 to the exhaust manifold 40 and to an aftertreatment system such as a catalytic converter.

The intake and exhaust valve 42, 44 positions and timing, as well as the fuel injection timing and ignition timing may be varied for the various engine strokes.

The engine 20 includes a cooling system to remove heat from the engine 20, and may be integrated into the engine 20 as a cooling jacket containing water or another coolant.

A head gasket 78 may be interposed between the cylinder block 76 and the cylinder head 79 to seal the cylinders 22.

Typically, a cylinder head is made from metal and/or ceramic. Yet, the traditional manufacturing methods include a number of steps and/or a number of parts such that the cylinder head is manufactured in separate parts which are subsequently assembled together. Even if the cylinder head is cast as one piece, the traditional metal-forming and/or composite-forming techniques such as casting or molding present manufacturing limitations regarding the cylinder head geometry. Intricate, detailed parts thus can be added only as separate pieces, requiring a number of connecting parts. If the connecting parts are made from different materials than the cylinder head itself, the connection typically presents a challenge, especially if the bond is to be leak-proof. Assembly may thus be time consuming and add to cycle time. Moreover, anytime bonding of at least two components is required, necessary control checks are vital to ensure that the bond is provided correctly. Such checks are expensive and add to cycle time.

Figure 2:
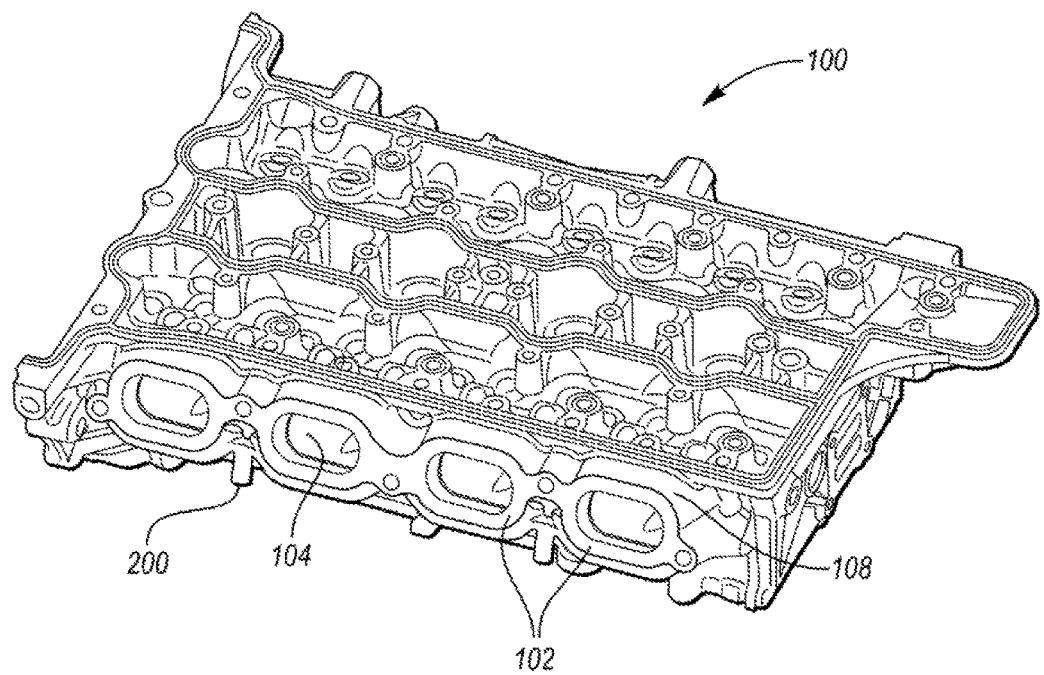
FIG. 2 illustrates a schematic perspective view of an example cylinder head employing a port disclosed herein.

In one or more embodiments, a cylinder head 100, which overcomes one or more problems described above, is disclosed herein. FIG. 2 shows a non-limiting example of the cylinder head 100 which may be used in the internal combustion engine 20 of FIG. 1 or in a different internal combustion engine system. The cylinder head 100 may be made from metal such as iron, stainless steel, aluminum. Alternatively, the cylinder head 100 may be made from at least two types of material including composite materials. The cylinder head 100 may thus feature portions made from polymeric materials, ceramic, composite, metal, or a combination thereof. The cylinder head 100 presents such geometry and materials that result that enable containment of the combustion pressure and thermal loading while allowing the cylinder head 100 to be lightweight and thus contribute to better fuel efficiency. The cylinder head 100 may have other advantages such as good corrosion resistance, thermal benefits such as an optimized heat transfer, maintained rigidity, and/or reduced number of machine operations during production of the cylinder head compared to cast iron or aluminum cylinder heads.

The cylinder head 100 may feature the following components: one or more valve stem guides, an exhaust face, one or more intake valve spring seats, one or more exhaust valve spring seats, a fire deck, one or more domes of one or more combustion chambers, one or more head bolt columns, or a combination thereof. The fire or head deck may include one or more intake and/or exhaust ports, which are passages leading from manifolds to respective valves. Specifically, the cylinder head includes exhaust ports leading to an exhaust manifold (not depicted).

Figure 3:
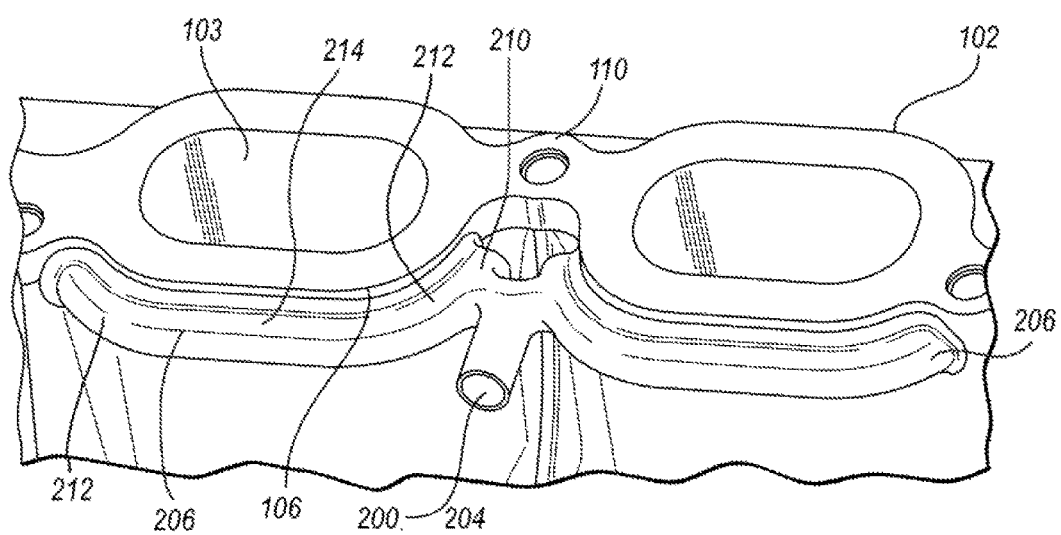
FIG. 3 illustrates a detailed view of a portion of the cylinder head depicted in FIG. 2 with an example integral fluid delivery port.

Additionally, the cylinder head 100 includes one or more intake ports 102 leading to or connecting to an intake manifold (not depicted), specifically to an outlet of the intake manifold from one or more runners of the intake manifold. FIG. 3 shows a more detailed view of two intake ports 102. Each intake port 106 includes an exterior lower side 106 and an upper side 1-8.

The named components as well as a number of other component and/or parts may be an integral part of the cylinder head 100 such that one portion of the cylinder head 100 gradually transitions into another portion of the cylinder head 100.

The depicted cylinder head 100 features a fluid port 200 which may lead a fluid into the cylinder head 100. The fluid may serve a variety of functions and target a variety of destinations. The fluid may be an additive fluid, a service fluid such as a fluid capable of cleaning a portion of the engine or a fluid capable of boosting the engine performance. Example fluids may include nitrous oxide, a fuel injector cleaner, engine degreaser, crankcase conditioner, a general purpose cleaner, carburetor cleaner, the like, or a combination thereof. Other fluids such as an exhaust gas or condensate are contemplated.

Figure 4A:
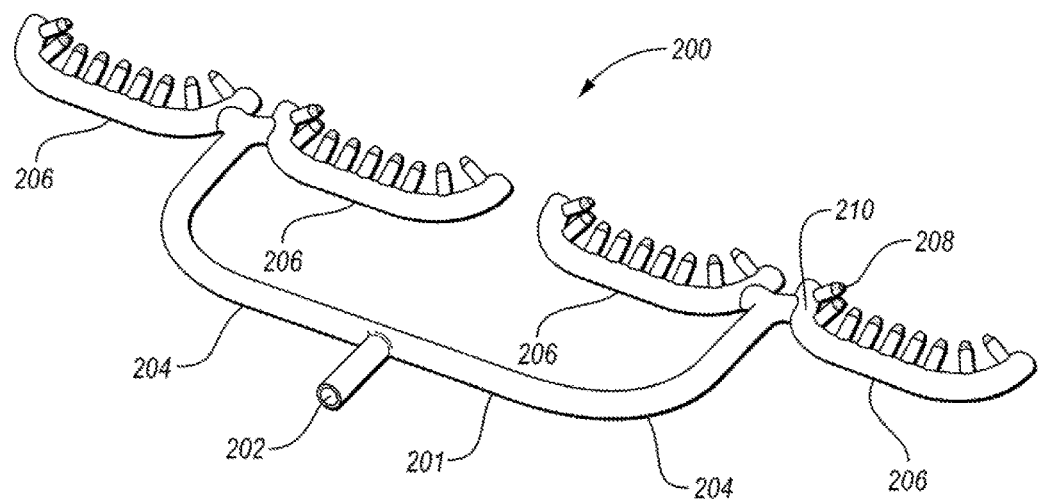
FIGS. 4A-4C illustrate various embodiments of the fluid distribution port integral with the cylinder head of FIGS. 2 and 3.
Figure 4B:
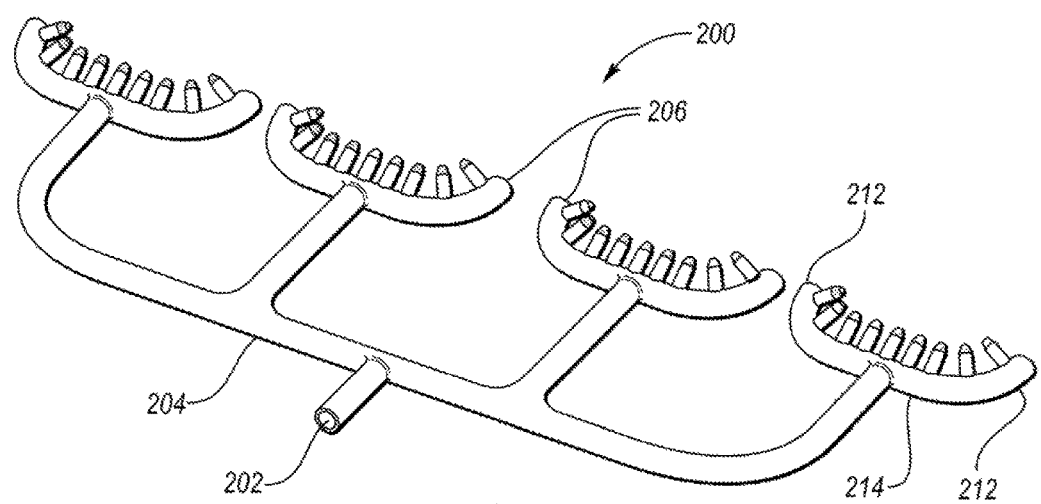
Figure 4C:
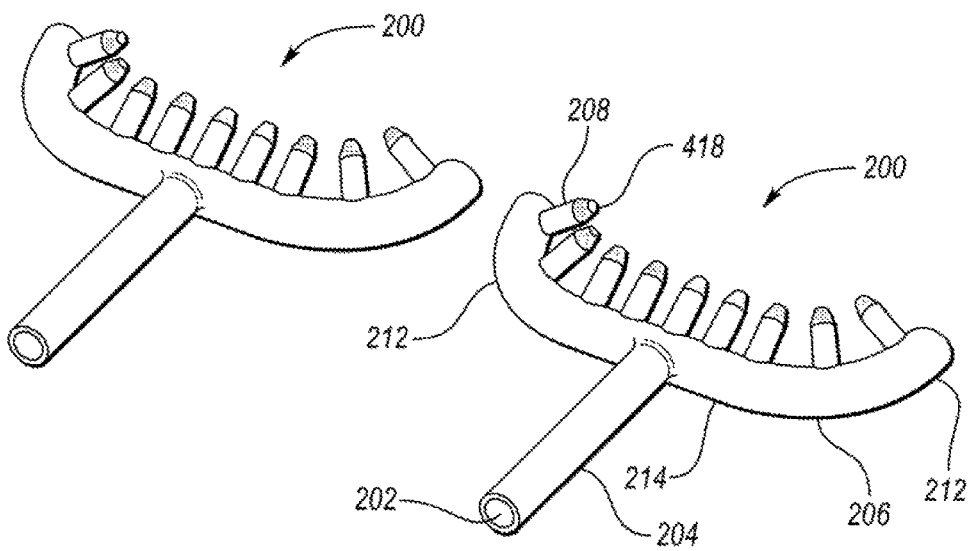

As is depicted in FIGS. 4A-4C, the fluid delivery port or port 200 may include at least one duct, conduit, tubing, or tube 201 having an inlet 202. The inlet may be tubular with a cross-section which is symmetrical, asymmetrical, regular, irregular, circular, oval, square, rectangular, triangular, oblong, or the like. The inlet 202 may be located outside of the cylinder head 100. For example, the inlet 202 may be located adjacent to an exterior wall of the cylinder head 100, run alongside the exterior wall of the cylinder head 100, and/or run perpendicular to the cylinder head 100 exterior wall. The tube 201 with the inlet 202 may be also an integral part of the cylinder head 100 body such that a portion of the tube 201 is an integral part of the cylinder head body, is closely adjacent to the body, or forms a portion of the cylinder head body.

The port 200 may include one or more branches or arms 204 extending into an interior of the cylinder head 100 such that there is no seal between the fluid delivery port 200 and the cylinder head 100. In other words, the port 200 and the cylinder head 100 are formed as integral parts, as a stratified unitary piece such that the port 200 seamlessly transitions into the cylinder head 100. The fluid delivery port 200 may include 2, 3, 4, 5, 6, 8, 10, or more branches 204. In at least one embodiment, a portion of the branches 204 may be located on the exterior of the cylinder head 100 and another portion of the branches 204 may be located on the interior of the cylinder head 100.

FIG. 4A illustrates the tubing 201 splitting into two branches 204. In at least one alternative embodiment, depicted in FIG. 4B, a single inlet 202 may provide the fluid to four individual, but interconnected branches 204. In a yet alternative embodiment of FIG. 4C, the inlet 202 may transition into a single branch 204, which is independent of additional tubing 201, inlets 202, and branches 204.

As is shown in FIG. 3 in detail, the individual branches 204 may approach the cylinder head 100, and attach to the exterior surface of the cylinder head 100 at, adjacent to, or between one or more intake ports 102. As FIG. 3 shows, the branches may approach the cylinder head 100, specifically at the port lower side 106, by the connection between two intake ports 110.

The amount and placement of the branches 204 depends on the specific design of the cylinder head 100. For example, a single branch 204 may be dedicated to intake port 102. In an alternative embodiment, depicted in FIGS. 2 and 3, a single branch 204 supplies the fluid to two wings 206, each surrounding n intake port 102. In a non-limiting example, a single branch 204 may be connected to each wing 206 via a connector 210, depicted for example in FIG. 3. The connection may be a gradual transition of the branch 204 into a wing 206. The connection may be located at an end portion 212, central portion 214 of the wing 206, or in a curved portion of the wing 206.

In at least one embodiment, example of which is illustrated in FIG. 3, each branch 204 may further extend into a set of wings or sub-branches 206. The extension of the branch 204 into the set of wings 206 may form a bifurcated tube. The set of wings may include two adjacent wings 206. The division of the branch 204 into a set of wings 206 may be symmetrical such that division may include a curved connector 210 from the branch 204 into each wing 206, one connector 210 curved to the right at an angle and a second connector 210 curved to the left at an angle. The angle may be 20, 30, 40, 45, 50, 60, 70, 75, 80, 90, or more degrees with respect to the direction of the branch 204. The connection may increase or decrease in diameter as the connection transitions into the wing 206.

The connector 210 gradually transitions from the branch 204 into the wing or sub-branch 206. The transition may be located at an end portion 212, central portion 214 of the wing 206, or in a curved portion of the wing 206. It may be beneficial to place the connector 210 further away from an end portion 212 of the wing 206 to provide for an even flow of the fluid within the wings 206.

Each wing 206 may be symmetrical or asymmetrical. For example, each wing 206 may form a curvature, even or uneven at each end 212. The wings 206 may be tubular or hollow or form a tubular or hollow member or a duct to allow flow of the fluid inside. The tubular curvature may enable even flow of the fluid from the branches 204 via the wings 206 to a destination such as a nozzle 208 from which the fluid enters the internal cavity of the cylinder head 100.

Each wing 206 may form a half-ring, half-oval, quarter ring, quarter oval, a ¾ ring, a ¾ oval, an entire ring or entire oval, a torus, a rounded rectangle, a rounded square. Other lengths of the wing 206 are contemplated. In at least one embodiment, the wing 206 may feature corners which are not curved or oblong such that the shape of the wing 206 may be square or rectangular with sharp corners. Yet with such design, an optimal even flow of fluid may be more difficult to achieve.

The wings 206 may at least partially surround a portion of the cylinder head 100, as is depicted in FIG. 3. For example, the wings 206 may partially or fully surround the intake port 102. When a wing 206 surrounds an intake port 102 partially or entirely, a portion of the wing 206 may protrude through at least one portion of the cylinder head 100 located between two adjacent intake ports 102 at the connection between intake ports 110. Thus, an entire circumference or length of an intake port 102, ¾, ½, ¼, or another portion of the circumference of the intake port 102 may be surrounded by a wing 206. In such case, nozzles 208 present in the wings 206 may be provided in only a portion of the wing 206 or in the entire length of the wing 206.

Each port 200 may include one or more nozzles 208 depicted in FIGS. 5-10C. The amount of nozzles may differ, depending on the needs of a specific application. The nozzles 208 may extend from the branch 204 or from the wing 206. For example, each branch 204 may include more than one nozzle 208. Alternatively, each wing 206 may include more than one nozzle 208. In a non-limiting example, a wing may include 1, 2, 3, 4, 5, 6, 7, 8, 9, 10, or more nozzles. The nozzles 208 may be the same or different in each wing 206, branch 204, port 200.

Figure 5:
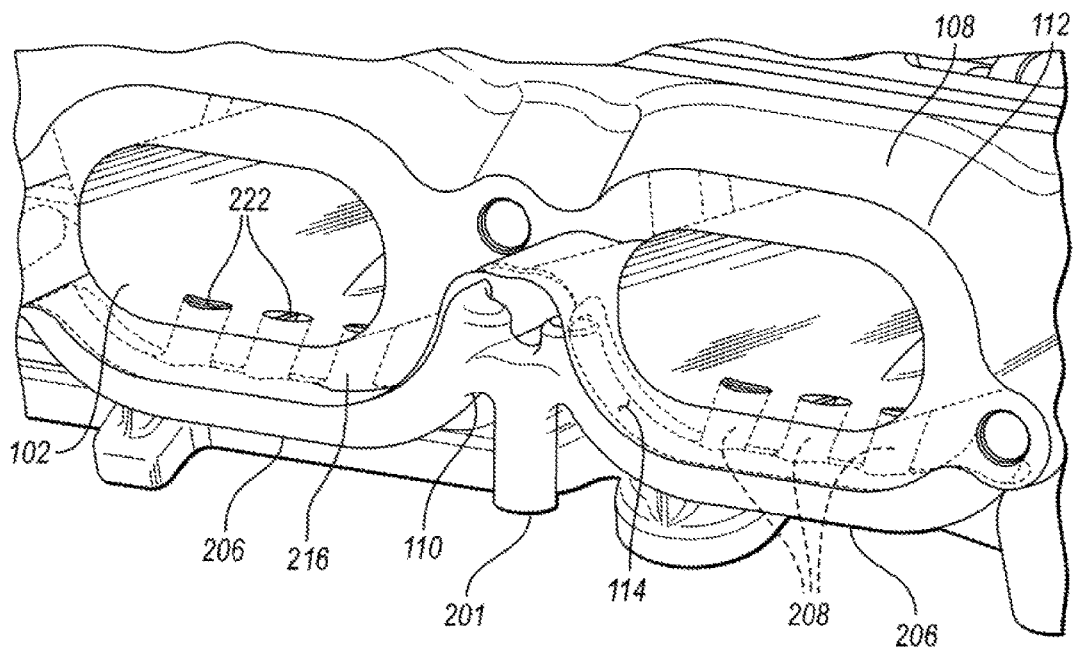
FIG. 5 shows an alternative view of the intake ports of the cylinder head and the integral fluid distribution port of FIG. 3.

The branch 204 or wing 206 may include the nozzles 208 along its entire length or only along a portion of its length as is illustrated for example in FIG. 5. The nozzles 208 may be spaced evenly or unevenly along the length of the branch 204 or wing 206. For example, in a non-limiting example embodiment where the wing 206 partially surrounds the intake port 102, the nozzles 208 may be located along the entire length of the wing 206.

Figure 7:
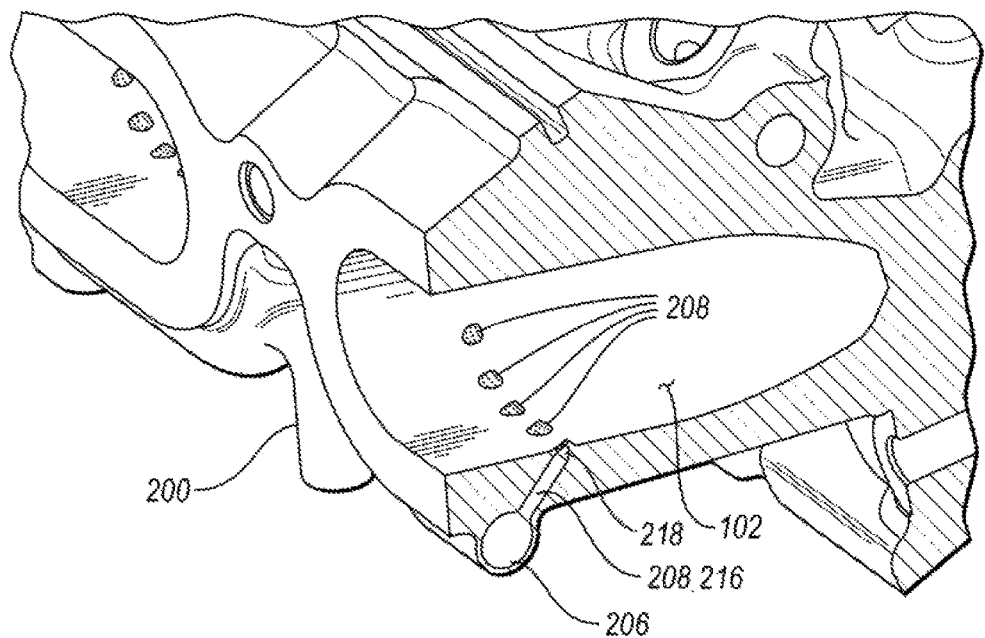
FIG. 7 shows an alternative example embodiment of the fluid distribution port within the cylinder head.

The nozzle 208 may have a body 216 and a tip 218, as is depicted in FIGS. 5 and 7. The body 216 may be elongated. The dimensions of the body 216 may be uniform or non-uniform. For example, the body 216 may narrow or widen in the direction from the port 200, branch 204, wing 206 towards the interior of the cylinder head 100. The diameter of the nozzle 208 is wide enough to enable flow of the fluid from the port 200 to the interior of the cylinder head 100. The diameter of the nozzle 208 may be smaller than the diameter of the branch 204, the wing 206, or both. The diameter of the nozzle 208 may be one eight, one fourth, one half of the diameter of the branch 204, the wing 206, or both. Alternatively, the diameter of the nozzle 208 may be once, twice, three times, four times, five times, eight times, or ten times smaller than the diameter of the branch 204, the wing 206, or both.

Each nozzle 208 may have the same or different dimensions of the body 216. For example, nozzles 208 with a first diameter may alternate with nozzles 208 having a second diameter, the second diameter being different from the first diameter. The first diameter may be smaller or greater than the second diameter. A third, fourth, fifth diameter, each different from one another and from the first and second diameter are contemplated. Alternatively, nozzles 208 with the first diameter may be the most outer nozzles 208 while the nozzles 208 with the second diameter may be located between the most outer nozzles 208.

Figure 6:
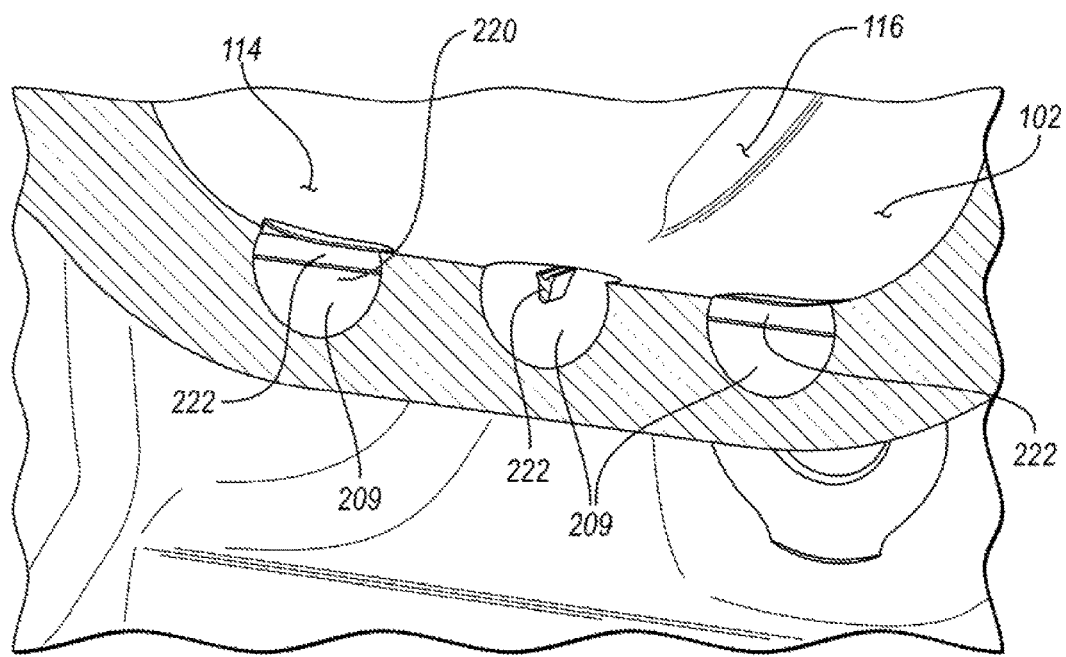
FIG. 6 shows a cross-sectional view of the fluid distribution port of FIG. 5.
Figure 8:
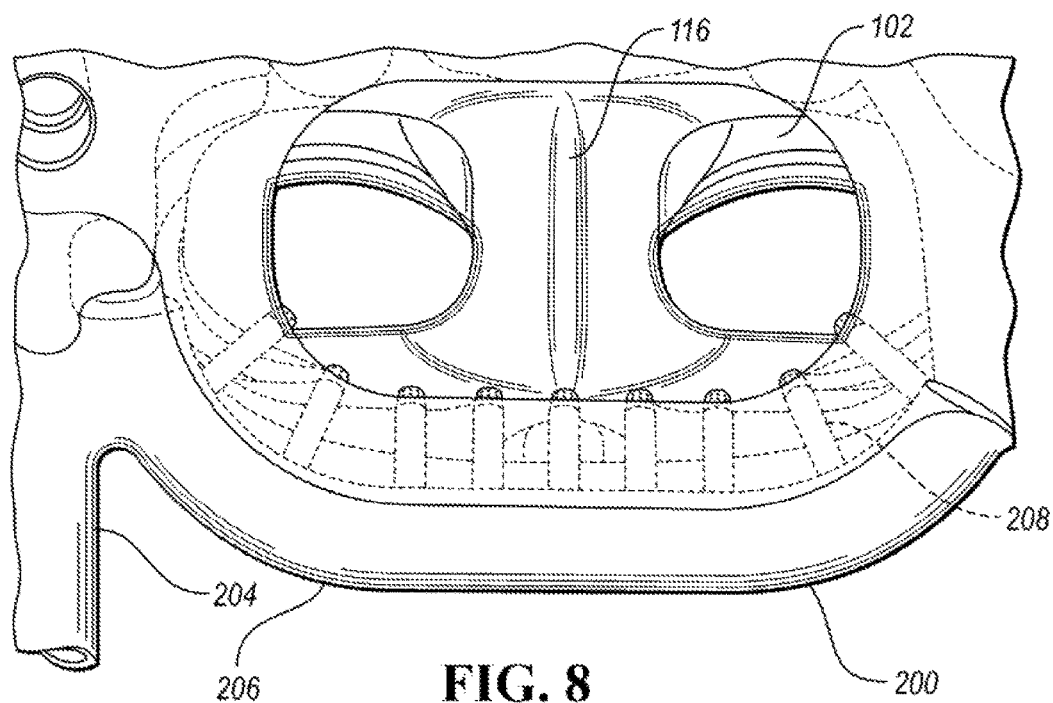
FIG. 8 shows a different view of the fluid distribution port of FIG. 7.
Figure 9:
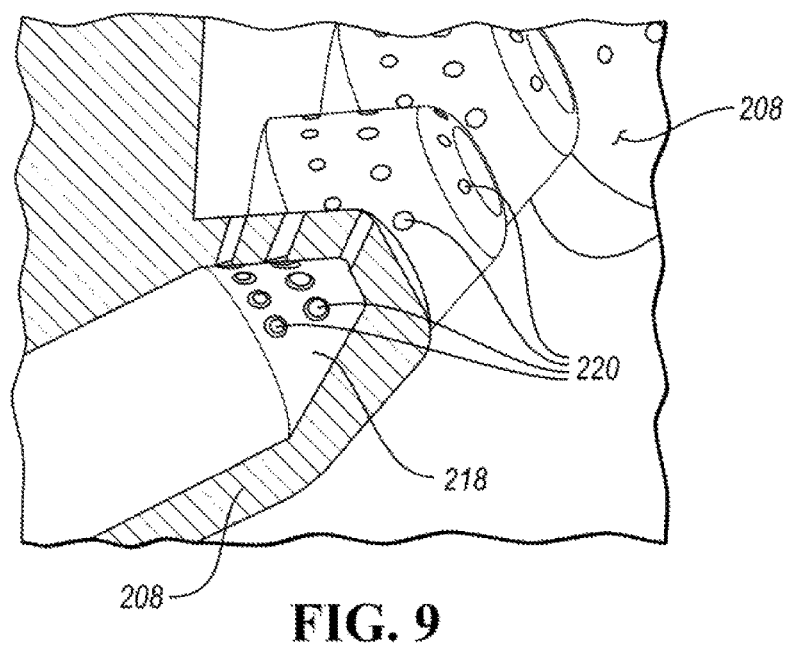
FIG. 9 shows a non-limiting example of nozzles with tips for fluid distribution protruding into an interior of the cylinder head intake port.

As is shown in FIGS. 5 and 6, the tip 218 may include an aperture 220 and/or be flush with an internal surface 114 of the intake port 102. Alternatively, as is illustrated in FIGS. 7 and 8, the tip 218 of the nozzle 208 may extend into the cavity of the cylinder head 100. The tip 218 may thus form a notch. The extension may encompass just the tip 218 and/or another portion of the nozzle 208. The tip 218 protruding into the internal space of the cylinder head 100 is further depicted in detail in FIG. 9.

The location, purpose, angle, and other properties of the port 200 determine the shape of the nozzle 208, the tip 218, or both. For example, the tip 218 may have a shape of a cone, conical frustum, half-sphere or dome, be rounded or pointed. Other shapes are contemplated. The tip 218 may feature at least one aperture or opening 220. A number of openings 220 may be present, for example arranged in a portion of the tip 218, around the entire circumference of the tip 218, in rows, regularly, irregularly spaced apart from each other. As can be seen in a non-limiting example of FIG. 9, three rows of openings 220 may be included on each tip 218, the openings 220 being present on a half of the tip 218 pointing towards the cavity of the intake port 102. The rows may feature the same or different openings 220. For example, a first row may feature openings 220 with a smaller or greater diameter than the openings 220 in a second, and/or third row. The number of openings 220 in each row may be the same or different.

In an alternative embodiment shown in FIGS. 5 and 6, the nozzle 208 may have a circular opening 220 flush with the inner surface of the intake port 102 and feature a number of diverters 222. The diverters 222 may be tapered or curved. The diverters 222 may be placed in a variety of locations. The function of the diverters 222 is to assist with directing the fluid in a specific direction, to help disperse the fluid onto desirable surfaces or avoid spraying the fluid onto surfaces which may be susceptible to high heat or other conditions caused by the fluid distribution into the cylinder head 100.

For example, depending on the type of fluid being distributed from the nozzles 208, it may be desirable to avoid spraying a divider 116, the central portion of the intake port 102 to avoid overheating of the divider 116 surface. Additionally, general avoidance of the fluid spray onto the divider 116 may be desirable as the fluid should advance into the internal passages of the cylinder head 100 as opposed to clinging to walls of the intake port 102. Yet, if a cleaner fluid directed to cleaning the internal spaces of the cylinder head 100 is being supplied via the port 200, it may be desirable to spray the cleaner fluid directly onto the walls. In such case, the diverters 222 may be shaped precisely to direct the fluid onto the diverter 116 and/or other internal surfaces 114 of the intake port 102.

Besides diverters 222, the nozzle 208 and/or the tip 218 may include one or more filters (not depicted) to purify the fluid to be released into the cylinder head 100. Alternatively, one or more filters may be placed anywhere else within the port 200 such as in the inlet 202, branch 204, wing 206, or a combination thereof.

Figure 10A:
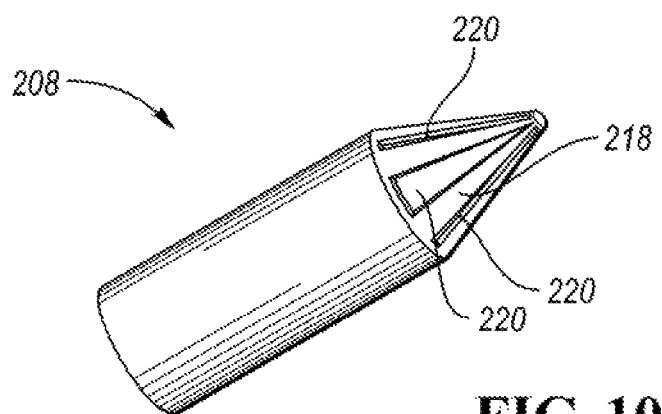
FIGS. 10A-10C show yet alternative example embodiments of nozzles of the fluid distribution port disclosed herein.
Figure 10B:
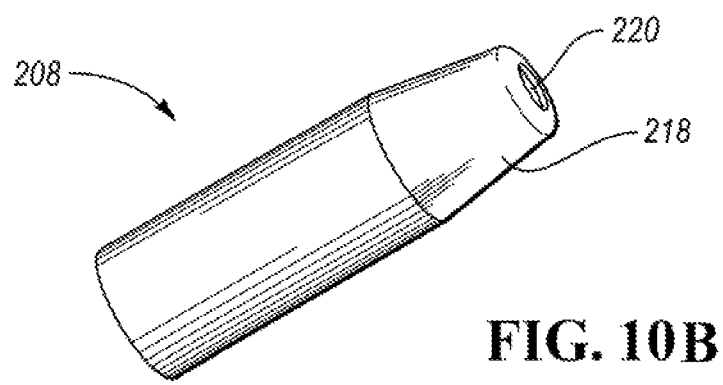
Figure 10C:
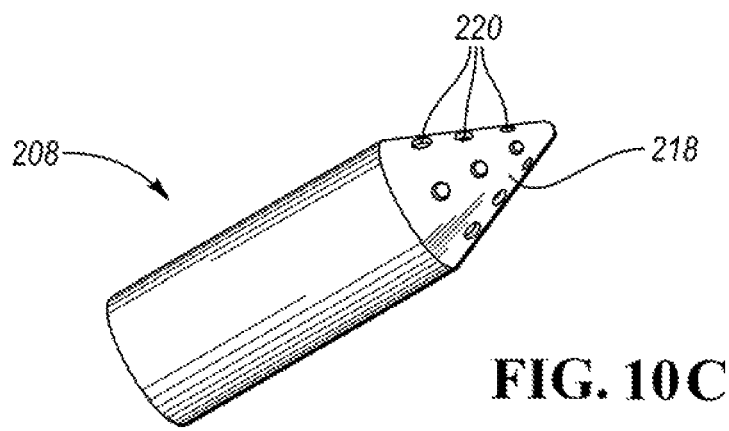

In yet alternative embodiments, depicted in FIGS. 10A-10C are a nozzle 208 having a tip 218 with elongated apertures 220, a nozzle 208 with a rounded tip 218 having a single aperture 218, and a nozzle having apertures 220 arranged around the entire circumference of the tip 218, respectively.

As was mentioned above, the fluid may be nitrous oxide such that the port 200 is configured as a nitrous oxide delivery apparatus or port connected to a supply or reservoir of nitrous oxide and adapted to increase an internal combustion engine's power output. Typical nitrous oxide delivery apparatuses are single point entry systems bolted to an intake manifold. The typical nitrous oxide delivery systems thus require a lot of mechanical fittings, feature flare style arrangements, which may be very complex, yet not enabling to include fine orifices or even a plurality of orifices. The port 200 designed as a nitrous oxide port in a cylinder head 100 instead of the intake manifold enables fine, more even distribution of nitrous oxide without disruptions to the gas path normally caused by a single-point entry systems and delivery of the nitrous oxide closer to the combustion chamber.

The port 200 may have yet different functions, for example serve as an EGR apparatus. The EGR apparatus serves as a nitrogen oxide reduction apparatus, capable of recirculating a portion of engine exhaust gas back to the engine cylinders. The EGR gas, typically flowing through an intake manifold, is enriched with gases inert to combustion, acting as absorbents of combustion heat, which reduces peak temperatures in the cylinders.

The typical EGR inlet port is located upstream of the cylinder head, within the gooseneck of an intake manifold, downstream of the throttle body or in the vicinity of the throttle body adapter area. The port is typically machined, leaving a port with sharp edges. Thus, when the EGR system is active, exhaust gas is introduced into the gas flow through a single location, which may cause disruption of the gas flow. Additionally, due to the single point of entry, the mixing of the exhaust gas with the gas is minimal.

To improve an overall performance and engine efficiency, the EGR gas may be lead via the port 200 arranged as an EGR apparatus or exhaust gas recirculator configured to reduce NOx of the engine and capable of distributing NOx directly into the interior of the cylinder head 100. An EGR gas travel via an intake manifold may thus be eliminated, and the EGR gas may be supplied much closer to the cylinders via port 200. The exhaust gas recirculator designed as port 200 may be connected to an exhaust manifold with an exhaust flow, tube, or tubing, and a valve capable of releasing the exhaust gas.

Additional advantages of the port 200 configured as the exhaust gas recirculator may include better mixing of the gasses within the cylinder head 100, delivery of the exhaust gas closer to the combustion system, even dispersion of the exhaust gas which may contribute to and maintain a more stable combustion process, contribution to a better thermal control of the system, and protection of the throttle body in the gooseneck, susceptible to high heat, from exposure to high temperatures associated with reintroduction of the exhaust gas to the intake manifold. The port 200 configured as the EGR apparatus thus becomes a part of the cooling of the engine system.

Alternatively still, the port 200 may be configured as a condensate port configured to provide condensate from a heat exchanger such as a charge air cooler, capable of collecting condensate, to the engine. The connection between the heat exchanger and the port 200 may be via tubing, a tube, a conduit, the like, or a combination thereof. A control valve may be provided as well. A filter may be included in or prior to the port 200 to remove any undesirable contaminants from the condensate.

Figure 11:
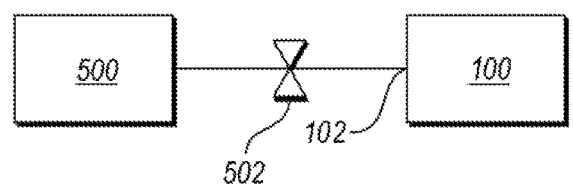
FIG. 11 schematically shows a connection between a supply of the fluid and the fluid distribution port.

FIG. 11 schematically shows connection of the cylinder head 100 via the port 200 to a supply of the fluid 500. The supply 500 may be a fluid reservoir, pool, collector, container, storage, a tank, a portion of the engine, a portion of the powertrain, an exhaust manifold, a heat exchanger, or another source. The supply may be continuous or discontinuous. The supply may be a one-time supply such as a one-time fluid addition which allows addition of the fluid from a container, which is not part of the automotive system, directly to the inlet 202. For example, a fluid may be provided from a container which may be discarded after the addition. The connection may be via tubing, flow, pipe, duct, line, hose, canal, channel, conduit, or the like. The connection may or may not include a valve 502, which may be a control valve allowing flow of the fluid from the supply 500 to the port 200 under a first set of circumstances and preventing flow of the fluid from the supply 500 to the port 200 under a second set of circumstances.

The cylinder head 100 may include more than one port 200, more than one inlet 201, or both. Each port 200 may be configured to supply the same or different fluid. Each port 200 may be connected to the same or different fluid supply 500. A single port 200 and/or inlet 201 may be also connected to more than one type of fluid such that the tubing 203 may have a valve, which may enable dispersion of a first, second, and/or third fluid into the cylinder head 100 on demand, depending on which fluid is needed.

A method of forming the integral cylinder head 100 and the fluid delivery port 200 is also disclosed herein. The enabler for production of the disclosed cylinder head 100, having unique structural features depicted in the Figures and described above, may be additive manufacturing. Additive manufacturing processes relate to technologies that build 3-D objects by adding layer upon layer of material. The material may be plastic, metal, concrete, or the like. Additive manufacturing includes a number of technologies such as 3-D printing, rapid prototyping, direct manufacturing, layered manufacturing, additive fabrication, vat photopolymerization including stereolithography (SLA) and digital light processing (DLP), material jetting, binder jetting, material extrusion, powder bed fusion, sheet lamination, directed energy deposition, and the like.

Early additive manufacturing focused on pre-production visualization models, fabricating prototypes, and the like. The quality of the fabricated articles determines their use and vice versa. The early articles formed by additive manufacturing were generally not designed to withstand long-term use. The additive manufacturing equipment was also expensive, and the speed was a hindrance to a widespread use of additive manufacturing for high volume applications. But recently, additive manufacturing processes have become faster and less expensive. Additive manufacturing technologies have also improved regarding the quality of the fabricated articles.

Any additive manufacturing technique may be used to produce the disclosed integral cylinder head 100 and the port 200 as additive manufacturing technologies operate according to a similar principle. The method may include utilizing a computer, 3-D modeling software (Computer Aided Design or CAD), a machine capable of applying material to create the layered cylinder head 100, and the layering material. An example method may also include creating a virtual design of the cylinder head 100 in a CAD file using a 3-D modeling program or with the use of a 3-D scanner which makes a 3-D digital copy of the cylinder head 100, for example from an already created cylinder head 100. The method may include slicing the digital file, with each slice containing data so that the cylinder head 100 may be formed layer by layer. The method may include reading of every slice by a machine applying the layering material. The method may include adding successive layers of the layering material in liquid, powder, or sheet format, and forming the cylinder head while joining each layer with the next layer so that there are hardly any visually discernable signs of the discreetly applied layers. The layers form the three-dimensional solid cylinder head described above having at least one intake port and fluid delivery port 200 such that the additive manufacturing process forms a unitary integral piece. The method may include forming the port 200 configured to provide a fluid to the cylinder head 100 such as an exhaust gas recirculator, nitrous oxide port, an additive fluid port, a service fluid port, or a condensate port. The method may also include forming additional features as integral parts of the cylinder head 100.

The additively manufactured cylinder head 100 with the port 200 may need to undergo one or more post-processing steps to yield the final 3-D object, for example stabilizing. Stabilizing relates to adjusting, modifying, enhancing, altering, securing, maintaining, preserving, balancing, or changing of one or more properties of the cylinder head 100 formed by additive manufacturing such that the formed cylinder head 100 meets predetermined standards post-manufacturing.

The stabilized cylinder head 100 remains in compliance with various standards for several hours, days, weeks, months, years, and/or decades after manufacturing. The property to be altered may relate to physical, chemical, optical, and/or mechanical properties. The properties may include dimensional stability, functionality, durability, wear-resistance, fade-resistance, chemical-resistance, water-resistance, ultra-violet (UV)-resistance, thermal resistance, memory retention, desired gloss, color, mechanical properties such as toughness, strength, flexibility, extension, the like, or a combination thereof.

Additive manufacturing enables formation of intricate shapes, undulating shapes, smooth contours and gradual transitions between adjacent segments or parts of the unitary cylinder head 100, resulting in a more even fluid distribution to the engine. For example, additive manufacturing enables formation of the intricate shapes of the branches 204, wings 206, connectors 210, nozzles 208, tips 218, apertures 220, diverters 222, and the like. The cylinder head 100 and the port(s) 200 formed by the method described above may be free of any fasteners, adhesives, or other types of bonds typical for traditional cylinder head manufacturing.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An engine additive fluid port comprising:
a series of material layers arranged as a first oblong hollow member configured to seamlessly surround at least a portion of an exterior surface of an integrated cylinder head's intake port, the member penetrating into a cavity of the intake port via a plurality of nozzles featuring apertures configured to spray a first fluid into the cavity such that the member and the cylinder head form a unitary piece.

2. The port of claim 1, wherein the hollow member surrounds the port only partially.

3. The port of claim 1, wherein the hollow member penetrates a portion of the cylinder head between adjacent intake ports.

4. The port of claim 1, wherein the hollow member forms a rounded rectangle.

5. The port of claim 1, wherein the first fluid is a service fluid.

6. The port of claim 1, wherein the port includes a second hollow member including nozzles featuring apertures capable of spraying a second fluid into the cavity.

7. The port of claim 5, wherein the first and second fluid are different fluids.

8. The port of claim 5, wherein the first and second hollow members are connected via tubing.

9. An automotive powertrain system comprising:
a nitrous oxide reservoir;
an engine cylinder head with an intake port; and
a seamless nitrous oxide port of stratified layers integral with the engine cylinder head, connected to the nitrous oxide reservoir and having an inlet branching into a plurality of wings housing a plurality of apertures protruding into an internal surface of the intake port such that there is no seal between the nitrous oxide port and the cylinder head.

10. The automotive powertrain system of claim 9, wherein the plurality of wings includes two symmetrical wings.

11. The automotive powertrain system of claim 9, wherein each of the plurality of apertures includes a diverter.

12. The automotive powertrain system of claim 11, wherein the diverter is tapered.

13. The automotive powertrain system of claim 12, wherein the diverter prevents distribution of the fluid onto a divider in the intake port.

14. An engine system comprising:
a cylinder head; and
a first curved layered duct forming a nitrous oxide port configured to increase an internal combustion engine's power output and surrounding a portion of the cylinder head such that there is no seal between the duct and the cylinder head, the duct at least partially surrounding an exterior portion and penetrating into an interior portion of an intake port via a plurality of nozzles with openings to deliver the nitrous oxide into the interior.

15. The engine system of claim 14, further comprising a second curved layered duct forming a nitrous oxide port.

16. The engine system of claim 15, wherein the first and second ducts are independent from each other.

17. The engine system of claim 15, wherein the first and second ducts share a same supply of nitrous oxide.

18. The engine system of claim 14, wherein the plurality of nozzles includes tips having the openings.

19. The engine system of claim 14, wherein the openings are identical.

20. The port of claim 1, wherein the hollow member follows a contour of the intake port.

* * * * *